A. H. NEULAND.
DYNAMO ELECTRIC MACHINE.
APPLICATION FILED FEB. 20, 1914.
1,223,094.
Patented Apr. 17, 1917.
3 SHEETS—SHEET 2.
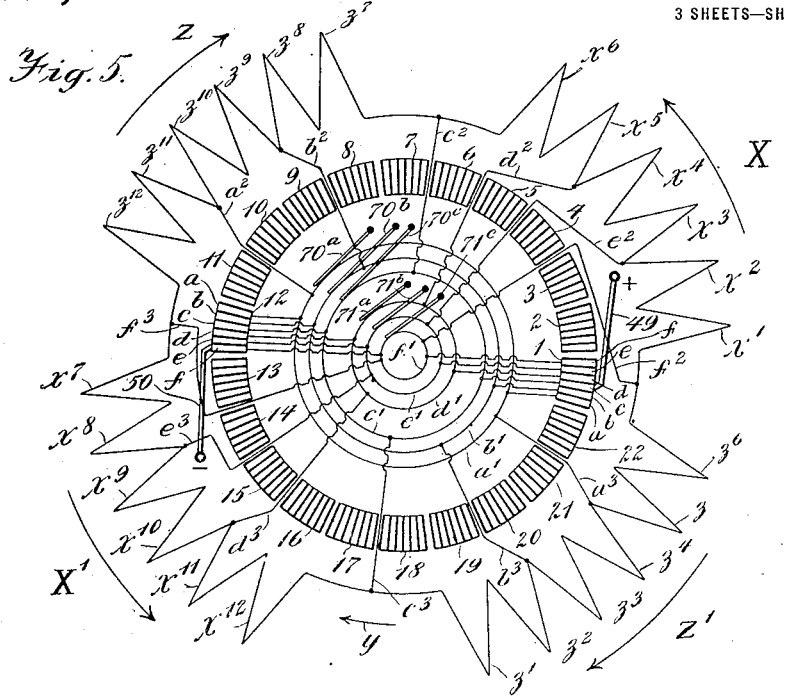
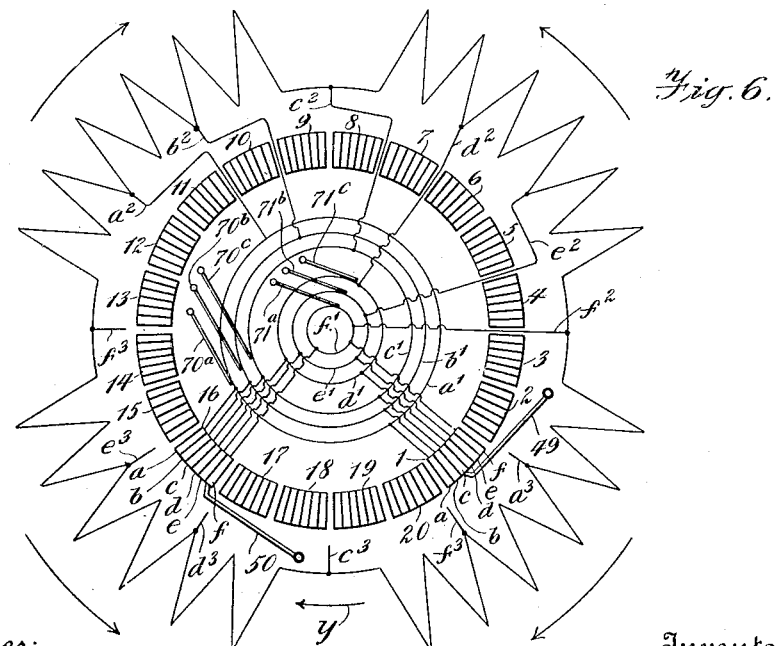
Witnesses:
Geo. C. Cheney,
Waldo M. Chapin
Inventor
Alfons H. Neuland
By his Attorneys
Rosenbaum, Stockbridge & Borst

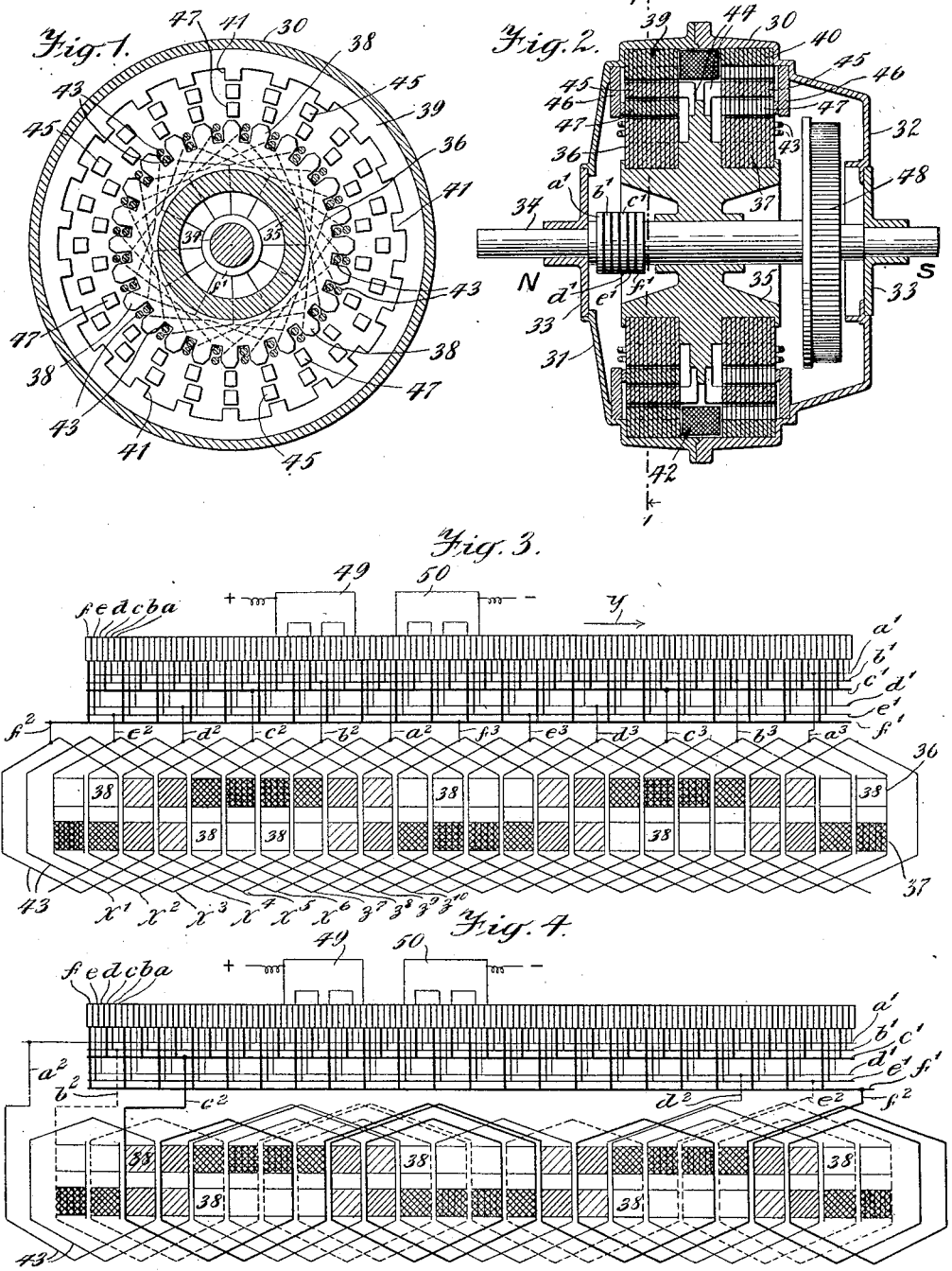

A. H. NEULAND.
DYNAMO ELECTRIC MACHINE.
APPLICATION FILED FEB. 20, 1914.

1,223,094.

Patented Apr. 17, 1917.
3 SHEETS—SHEET 3.

Witnesses:

Inventor
Alfons H. Neuland
By his Attorneys
Rosenbaum, Stockbridge & Borst

UNITED STATES PATENT OFFICE.

ALFONS H. NEULAND, OF BERGENFIELD, NEW JERSEY.

DYNAMO-ELECTRIC MACHINE.

1,223,094.  Specification of Letters Patent.  Patented Apr. 17, 1917.

Application filed February 20, 1914. Serial No. 819,920.

*To all whom it may concern:*

Be it known that I, ALFONS H. NEULAND, a subject of the Czar of Russia, residing at Bergenfield, in the county of Bergen and State of New Jersey, have invented certain new and useful Improvements in Dynamo-Electric Machines, of which the following is a full, clear, and exact description.

My invention relates to dynamo-electric machines, and particularly to such machines of the commutating type.

One object of my invention is to provide such a machine which will generate alternating current, either single phase or polyphase, having a high frequency relative to the rotation of the member generating the current. Another object is to provide for the commutating of such currents either to direct currents or to alternating currents, single or polyphase, having a relatively low frequency. Another object is to provide such a machine which may be used as a direct current motor and as an alternating current low frequency high power, that is, high weight efficiency motor, employing either single or polyphase current and by which alternating current, either single or polyphase, having a high frequency, may be converted to either a direct current or to an alternating current having a relatively low frequency, or by which a direct current or alternating current of low frequency may be converted to an alternating current of relatively high frequency.

Another object is to obtain a high out-put in proportion to the weight of the machine, and a high efficiency relative to the out-put of the machine, that is, high electrical efficiency. Still other objects and advantages of my invention, will appear from the following description.

In accordance with my invention, I provide a number of collector members, which will usually take the form of collector rings, or slip rings on the commutator shaft, and to which current may be supplied or from which current may be taken, and I divide the commutator circumferentially into a plurality of insulated segments comprising consecutive groups, each of which groups contains a number of segments equal to that of the collector members, and the corresponding segments of each group are connected in multiple to one of the collector members and form sets, the number of sets, therefore, being equal to that of the collector members.

Specifically I also provide an armature or induced winding that is, one in which the current is induced when the machine operates as a generator, having a plurality of leads therefrom, at least one lead being connected to each collector member, together with means for producing a rapidly revolving magnetic field in inductive relation to the winding and causing every portion of the field which is cut by any given coil of the induced winding to rapidly reverse in direction relative to the coil, which field has a higher angular velocity than that of the commutator, and which generates in the winding an alternating current having a high frequency relative to the rotation of the commutator.

My invention also comprehends various other features of construction and arrangements and combinations of parts, as will hereinafter more fully appear.

I shall now describe the embodiments of my invention illustrated in the accompanying drawings, and shall thereafter point out my invention in claims.

Figure 1 is a transverse vertical section of a machine embodying my invention, taken on line 1—1 of Fig. 2, looking toward the left;

Fig. 2 is a central longitudinal section of the same;

Fig. 3 is a diagram of the commutator segments and of the winding and of the connections between the same;

Fig. 4 is a similar diagram showing a modified form of winding;

Fig. 5 is a somewhat different form of diagram of the winding and commutator segments and of some of the connections between them, the others being omitted for the sake of clearness of illustration;

Fig. 6 is a diagram similar to Fig. 5, showing a modified construction; and

Figure 7:
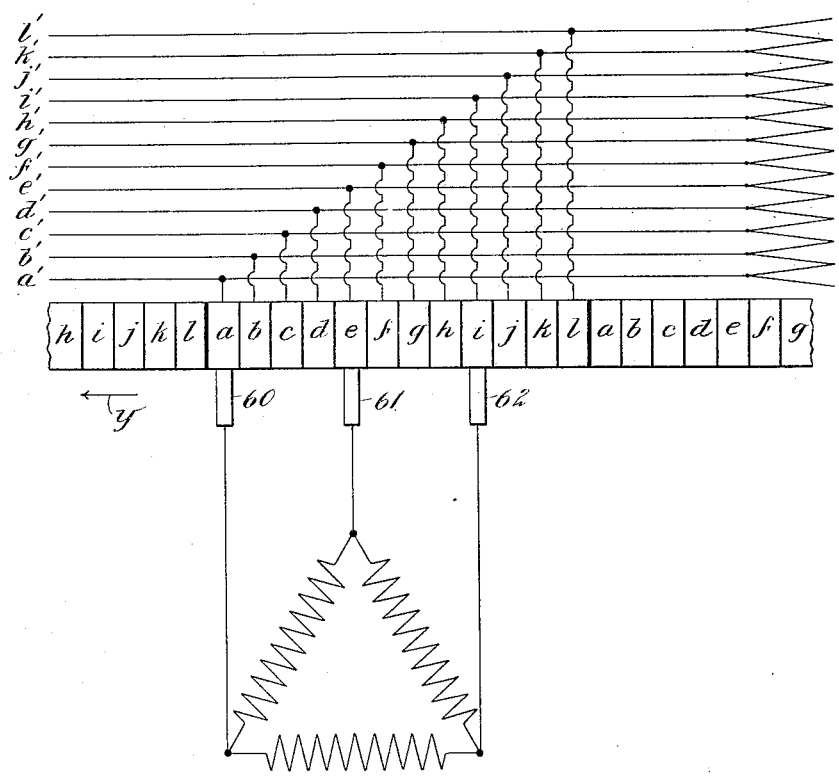
Fig. 7 is a diagram of a portion of the commutator segments of another modification, and of the winding and a portion of the connections between them.

In the illustrated embodiments of my invention, I provide a rotor having two spaced rotor elements, and a stator having two spaced stator elements complementary to the respective rotor elements with a magnetizing coil disposed between them, an armature winding about the rotor, and means to cause the path of least magnetic reluctance between the rotor and stator elements to revolve about the rotor as the rotor rotates and at a greater angular velocity than that of the rotor, and to cause the magnetic flux simultaneously to alternate rapidly between the two pairs of rotor and stator elements relative to any given coil of the armature, the term "alternate" being used to denote a complete reversal in direction of the flux in contradistinction to a pulsation thereof, whereby there is induced in the winding an alternating current having very high frequency relative to the rotation of the rotor. These generator features are substantially of the construction disclosed in my co-pending application, Serial No. 786,907, filed August 27, 1913.

While it will be understood that the illustrated machine may be employed with efficiency either as a generator or as a motor, the description herein will be confined to its operation as a generator. The casing of the machine consists of a cylindrical portion 30 and the side plates 31 and 32 in which are the bearings 33 for the rotor or commutator shaft 34. Mounted on the rotor shaft 34 is the rotor member which comprises a soft iron core 35 which serves as a conductor for the magnetic flux, and surrounding this core 35 and secured thereto on its opposite ends are two spaced annular laminated rotor elements 36 and 37. In the embodiment shown these rotor elements are provided about their peripheries with a plurality of similar equally spaced longitudinally extending teeth 38, as will hereinafter appear.

Secured to the inner face of the cylindrical portion 30 of the casing and surrounding the respective rotor elements 36 and 37 in coöperative relation therewith, are two annular laminated spaced stator elements 39 and 40, which, in the embodiment shown, are also provided on their inner periphery with a plurality of similar equally spaced longitudinally extending teeth 41, as will hereinafter appear.

The magnetizing or field winding 42 is disposed between the two stator elements 39 and 40, and when the machine is used as a generator, this magnetizing winding will be supplied with a direct exciting current which will produce a north polarity on one side of the machine and a south polarity on the opposite side, as indicated. The distributed armature or rotor winding 43 is disposed in the spaces between the teeth 38 of the rotor, and the coils span both rotor elements 36 and 37, as shown in Fig. 2, and as indicated in the diagrams in Figs. 3 and 4. In the construction illustrated in Figs. 1 and 3 this armature winding is the well known closed circuit, or multiple connected single lap winding, and in Fig. 4 an open circuit three phase winding is illustrated, and it will be understood that these are examples of various forms of winding which may be adopted.

The number of teeth on the rotor elements is different from that of the stator elements, and, in the embodiment shown, the rotor elements are provided with twenty four teeth and the stator elements with twenty-two teeth. The teeth on one element are off-set circumferentially relative to those on the other complementary element a half tooth pitch, and the teeth on the stator elements of the machine are shown as thus relatively off-set in Fig. 2. With this construction there are two points of alinement 180° apart between the rotor and stator teeth on each side of the machine, and due to the relative off-setting of the teeth of one of the elements, the points of alinement on one side are 90° from those on the other side. For example, in Fig. 2, if the teeth on the left side of the machine are alined in the plane of section, the teeth on the right side will be alined in a plane at right angles to the plane of section. This produces two positive rotating poles on one side of the machine, and two negative rotating poles on the other side of the machine, the poles being in quadrature.

The teeth on the coöperative stator and rotor elements are progressively more and more non-alined between the points of alinement and the points at right angles thereto, at which latter points they are in complete staggered relation to each other. In order to thoroughly break the magnetic path between the rotor and stator at these intermediate points and thereby reduce leakage under load, the rotor and stator elements are spaced some distance apart in the embodiment shown, and in this annular air gap there are provided coöperative laminated magnetic bars which serve to effectively make and break the magnetic circuit. Secured to the rotor by supporting plates 44 of non-magnetic material are one or more series of laminated or partly laminated magnetic bars 45 arranged in radial alinement with the rotor teeth 38 and corresponding in number thereto, and rotative in close proximity to the inner ends of the stator teeth 41; and secured to the stator elements by plates 46 of non-magnetic material are the stator bars 47 disposed in alternate relation to the rotor bars and in radial alinement with the stator teeth 41. These magnetic bars are alined at the same points that the teeth are alined, and at their points of alinement they form a complete closed magnetic path between the rotor and stator elements, while at their points of non-alinement they effectively break the magnetic path, as shown, and substantially decrease leakage of the magnetic flux. It will be apparent that the rotor and stator teeth could be dispensed with when the magnetic bars are used.

It will now be seen that upon the rotation of the rotor and the rotor bars carried thereby a distance equal to one tooth pitch on the rotor, the point of alinement of the teeth and bars on each side of the machine is gradually shifted around the circumference of the rotor for an angular distance of 180°, thereby causing the rotation of the path of least magnetic reluctance for one half a complete rotation for every angular movement of the rotor for one tooth pitch, or in other words, the magnetic path between the rotor and stator on each side of the machine makes twelve complete rotations to each rotation of the rotor, and since the number of teeth on the rotor is greater than that of the stator, the rotation of this path is in the same direction as that of the rotor, while it is apparent that its rotation would be in the opposite direction if the number of teeth of the stator exceeded that of the rotor.

The magnetic flux divides, in a four pole machine such as illustrated, into two paths, each path being from one north pole of the rotor element having that polarity to the coöperative stator element through the alined teeth and bars and thence through the casing 30 and stator element on the opposite side of the machine circumferentially therefor for 90° to the point of alinement of the teeth and bars on that side of the machine, and thence through these alined teeth and bars to the rotor element on that side of the machine and thence through the core 35. This path is indicated generally by the letters N and S in Fig. 2, and in the position shown in this figure, the path will be from the rotor element 36, one half going up and the other half going down through the alined teeth and bars 38, 47, 45 and 41 to the stator element 39 and thence to the casing 30 and stator element 40 around the casing and stator element 40 for 90°, one half going in one direction and the other in the opposite direction about the stator element 40 until the points of alinement of the teeth and bars are reached, and thence inwardly to the rotor element 37 and thence through the core 35 back to the place of beginning.

As the rotor element is rotated a half tooth pitch, however, the teeth and bars which are alined in the position shown in Fig. 1 will become staggered, while those shown as staggered will become alined, and this will result in a reversal of the magnetic flux relative to the coils of the rotor winding. In other words, since the coils span the rotor teeth on both sides of the machine, and in one position the teeth on one side are alined and in the next position the teeth on the opposite side are alined, the magnetic flux in one position passes upwardly through the coil and in the next position passes downwardly through the coil, and this complete cycle of the magnetic field causes one complete cycle of current to be induced in the coil.

Thus the rotation of the rotor produces a revolving magnetic field, every portion which is cut by any given coil of the rotor winding rapidly reversing relative to the coil, which field makes twelve complete revolutions to each rotation of the rotor. As explained above, each revolution of the magnetic field induces two complete cycles in the windings, but since the revolving magnetic field travels in the same direction as the rotor, the windings on the rotor, since they follow the progression of the magnetic field, are cut by the alternating field only twenty-two instead of twenty-four times, or in other words, there are twenty-two complete cycles of current induced in the windings for each rotation of the rotor. It will be observed that the frequency of the induced alternating current per rotation of the rotor is equal to the number of stator teeth, and that the current induced in the coils in two opposite quadrants is in the same direction, and opposite to that induced simultaneously in the coils of the other two quadrants.

In order to commutate the current thus generated, the winding is provided with a number of taps or leads, which are connected to conductors which I term collector members. In the case of the closed circuit winding, the taps are taken off from equi-distant points around the winding, as shown in Figs. 3, 5 and 6, and, since this is a four-pole machine, the taps from the opposing coils are connected in multiple to the collector members, while in the case of an open circuit three phase winding, as illustrated in Fig. 4, the leads are from coils properly distributed about the rotor, and the collector members are in effect continuations thereof. The commutator 48 is divided circumferentially into a plurality of insulated segments, which are arranged in sets equal in number to that of the collector members, and the segments of each set are connected in multiple to one of the collector members. The corresponding segments of each set are equidistantly spaced around the commutator, with the result that the corresponding segments are arranged in consecutive groups about the commutator, each group containing one segment of each set. In the embodiment shown in Figs. 1 to 5, inclusive, in which commutator construction direct current is obtained at the commutator brushes, there are as many segments in each set as there are complete cycles of current induced in the coils by each rotation of the rotor, that is to say, there are twenty-two segments to each set. In the three phase winding there are six leads $a^2$, $b^2$, $c^2$, $d^2$, $e^2$ and $f^2$, which connect to collector members $a'$, $b'$, $c'$, $d'$, $e'$, and $f'$ respectively, the opposite coils of each phase being oppositely wound, while in the closed circuit winding there are twelve equi-distant leads or taps $a^2$, $b^2$, $c^2$, $d^2$, $e^2$, $f^2$, $a^3$, $b^3$, $c^3$, $d^3$, $e^3$, $f^3$, the opposite coils being connected in multiple to the collector members $a'$, $b'$, $c'$, $d'$, $e'$, $f'$, reducing the collector members to six. These collector members may be in the form of slip rings on the rotor shaft, as shown in Fig. 2. Since there are six collector members, there are six sets of commutator segments connected to the respective collector members, the six corresponding segments of each set being arranged consecutively, forming groups, there being, therefore, twenty-two consecutive groups of six segments each, $a$, $b$, $c$, $d$, $e$ and $f$, about the commutator, or one hundred and thirty-two segments in all.

Since there are twenty-two complete reversals or forty-four alternations of the magnetic flux during each rotation of the rotor, there is an angular movement of the rotor one forty-fourth of a complete rotation to effect a reversal of current in the coils, or in other words, the commutator moves an angular distance of three segments for each reversal, or six segments for the complete cycle, and brushes 49 and 50, when disposed at proper points around the circumference of a commutator, will always retain their neutral positions with respect to the direction and intensity of the flux through the coils, irrespective of the position of the rotor and of the difference in the angular velocities of the flux and commutator.

For example, in the position of the parts illustrated in the diagram of Fig. 5, if the current in the six coils of each of the quadrants X and X' is in the direction indicated by the arrows, then the current in the two quadrants Z and Z' will be in the opposite direction as indicated by the arrows, and the current will flow inwardly through the taps $c^2$ and $c^3$ and outwardly through the taps $f^2$ and $f^3$. The current flows from the taps $c^2$ and $c^3$ to the collector member $c'$ and thence to each segment $c$ of each of the groups, 1 to 22, inclusive, and thence to the brush 49 which is in contact with one segment $c$ and thence through the external circuit to the brush 50 which is in contact with one segment $f$ and thence through this segment $f$ to the collector member $f'$ and the taps $f^2$ and $f^3$. The commutator rotates in the direction indicated by the arrow $y$, and the progression and direction of the magnetic field is indicated in the diagrams of Figs. 3 and 4, the intensity of the field through the various coils being represented by the respective intensities of the cross hatching on the respective rotor elements 36 and 37, there being, as indicated, a slight overlapping of the magnetic flux through the stator and rotor teeth on the two sides of the machine.

It will therefore be observed that the magnetic flux falls successively in the coils from the maximum intensity in one direction to zero and then rises from zero to the maximum intensity in the other direction as the magnetic field revolves, and the current, therefore, progressively rises and falls and reverses in the commutator segments. As the rotor and commutator rotate, the current flows inwardly successively through the leads or taps $b^2$, $b^3$, $a^2$, $a^3$, etc., the potential in the leads or taps $f^2$ and $f^3$ gradually falling and reversing until it reaches the maximum in the positive direction when the commutator and rotor have rotated one forty-fourth of the complete rotation, or in other words, just as the segment $f$ of group 1 comes underneath brush 49; and at the same time the potential of the segments $c$ has been falling and reversing until it has reached its maximum in the negative direction just as segment $c$ of group 13 comes underneath the brush 50, and so on. It will thus be seen that the brushes always retain their neutral positions and that there is a complete cycle of current induced in the coils during each angular movement of the commutator for a distance of one group or six segments, or in other words, that there are twenty-two complete cycles of current induced in the coils for each complete rotation of the rotor and commutator.

If the number of groups of commutator segments be equal to the number of complete cycles of current induced in the coils by each rotation of the rotor, the current delivered to the brushes will be a direct current, as above described. If now the number of commutator segments be increased or decreased from the number of cycles per rotation of the rotor, the neutral points will gradually get ahead of or fall behind the revolving magnetic field, resulting in a slowly alternating current in the brushes 49 and 50. Such a construction is illustrated in Fig. 6 where the number of groups of segments is twenty instead of twenty-two, while the rest of the construction of the machine is the same. Since the current reverses once during every angular movement of the commutator for a distance of three segments, and since there are twelve segments less than in the case of the direct current commutator, the current will reverse four times during a rotation of the rotor or once during each angular movement of the commutator of 90°, or in other words, there will be two cycles of current delivered to the brushes during each complete rotation of the rotor. It will readily be seen that the same result will be obtained if the number of segment groups be twenty-four instead of twenty, and that the frequency of the alternating current delivered at the brushes may be varied by varying the number of segment groups.

Polyphase currents of comparatively low frequency may also be collected by brushes properly arranged upon the circumference of the commutator, if the number of collector members and taps from the winding be increased, and the number of sets of commutator segments be increased accordingly. For example, the diagram of Fig. 7 in which is represented a portion of the commutator periphery and of the closed winding and of the electrical connections between them, shows one construction whereby polyphase currents may be collected. Here the number of sets of segments is increased to twelve, there being therefore twelve segments in each group, lettered $a$ to $l$, inclusive, and there being for example, twenty groups as in Fig. 6, and the number of collector members is also accordingly twelve, $a'$, $b'$, etc. Three brushes 60, 61 and 62 are properly spaced in contact with the commutator segments, as illustrated, and it is manifest that they will collect the three-phase alternating current.

Furthermore, my commutating machine is adapted for use as a converter and may be employed to variously convert the character of current delivered to it, and some of these uses will be specified. For example, if the collector members $a'$, $b'$, $c'$, $d'$, $e'$, and $f'$ be in the form of collector rings or slip rings on the commutator shaft, and brushes $70^a$, $70^b$, $70^c$ and $71^a$, $71^b$, $71^c$, be arranged thereon, so that they are adapted to have current supplied thereto or taken therefrom, and there be a different number of groups of commutator segments than there are teeth on the stator, the introduction of an alternating-current into the collector rings and the synchronous rotation of the rotor as determined by the supplied frequency, will result in a much lower frequency at the brushes on the commutator, the ratio in this case being 1:11 with respect to the impressed frequency, and the current obtained at the brushes on the commutator may be single phase, or may be polyphase as explained with reference to Fig. 7. Similarly, a current having a low frequency, single or polyphase, may be converted into a current having a high frequency, single or polyphase, by delivering the current to the brushes on the commutator and taking it off from the brushes on the collector rings.

This machine may also be used to convert a high frequency alternating current, either single or polyphase, into a direct current, and vice versa, in this case there being the same number of groups of commutator segments as there are teeth on the stator, as illustrated in Fig. 5. It is also evident that the introduction of a direct current at the brushes on the commutator will result in an alternating current at the collector rings, either single or polyphase, as is determined by the arrangement of the brushes on the collector-rings, and the frequency of which is determined by the rate of rotation of the rotor. Likewise, the introduction of an alternating current at the collector rings, either single or polyphase, and the synchronous rotation of the rotor, will enable the collection of a direct current at the commutator brushes.

From the above, it will be seen that my invention is susceptible of many adaptations and that the illustrated embodiments may be employed for the following purposes:—

(1) An alternating current, single or polyphase, high frequency per revolution, generator or synchronous motor, in which case the current is taken off from or supplied to the collector rings.

(2) An alternating current, single or polyphase, low frequency per revolution, generator or synchronous motor, in which case current is taken from or supplied to the commutator brushes, and the commutator being of the construction illustrated in Fig. 6, or of equivalent construction.

(3) Direct current generator or motor, in which case the current is taken from or supplied to the brushes on the commutator, which is of the construction illustrated in Fig. 5.

(4) Alternating current commutating motor, in which use current is supplied to the brushes on the commutator, the commutator being of the construction illustrated in Fig. 5.

(5) To convert alternating current, single or polyphase, having a high frequency, to an alternating current single or polyphase, having a low frequency, in which case the construction shown in Fig. 6 is used and the current is impressed at the collector rings and delivered at the commutator brushes.

(6) To convert alternating current, single or polyphase, having a low frequency, to an alternating current single or polyphase, having a high frequency, in which use the construction shown in Fig. 6 is employed, and the current is impressed at the commutator brushes and delivered to the collector ring brushes.

(7) To convert alternating current, single or polyphase, having a high frequency, to a direct current, in which use the construction shown in Fig. 5 is employed and the current impressed on the collector rings and delivered at the commutator brushes.

(8) To convert direct current into alternating current, single or polyphase, having a high frequency per rotation of the rotor, in which use the construction shown in Fig. 5 is employed and the current is impressed at the commutator brushes and delivered at the collector rings.

The output relative to the weight of this machine, as a generator or motor, is very great due to the high velocity with which the magnetic field revolves, thereby cutting the winding of the rotor, but it will be readily understood that its output is considerably greater when used as a rotary converter, since only a portion of the impressed current traverses the winding, the rest passing directly from the brushes on the commutator to the collector rings, or vice versa.

The efficiency of such a machine in case of a generator or motor, is likewise very high on account of the iron and copper required in proportion to its output, and its efficiency is much higher in case of the converter, by reason of its greatly increased capacity as above explained.

It is obvious the part which carries the armature winding may be stationary, in which case the commutator would also be stationary, and the brushes revolve with the rotary part, and the following claims are intended to cover such an alternative construction; and it is obvious that various other modifications may be made in the constructions shown in the drawings and above particularly described, within the principle and scope of my invention.

I claim:—

1. A commutating machine comprising means including a rotatable element for producing a rapidly revolving magnetic field, an armature winding on the rotatable element arranged to be cut by the revolving field, a commutator on said rotatable element rotatable at a lower angular velocity than that of the magnetic field, a plurality of collector members, and a number of leads from the winding, at least one lead being connected to each collector member, the commutator being divided into a plurality of insulated segments arranged in consecutive groups, each group containing a number of segments corresponding to that of the collector members, and the corresponding segments of each group being connected in multiple to one of the collector members and forming a set.

2. A commutating machine comprising a rotatable armature winding, means for producing a magnetic field arranged to traverse the armature winding, a plurality of stationary flux conductors and a plurality of rotative flux conductors coöperative to cause the flux which traverses the winding to rapidly revolve, a plurality of collector members, and a commutator rotatable with the armature winding at a lower angular velocity than that of the magnetic field, the commutator being divided into a plurality of insulated segments arranged in consecutive groups, each group containing a number of segments corresponding in number to that of the collector members, the corresponding segments of each group being connected in multiple to one of the collector members.

3. A commutating machine comprising a rotatable armature winding, means for producing a magnetic field arranged to traverse the armature winding, a plurality of stationary flux conductors and a plurality of rotative flux conductors coöperative to cause the flux which traverses the winding to vary in intensity and to rapidly revolve, a plurality of collector members, and a commutator rotatable with the armature winding at a lower angular velocity than that of the magnetic field, the commutator being divided into a plurality of insulated segments arranged in consecutive groups, each group containing a number of segments corresponding in number to that of the collector members, the corresponding segments of each group being connected in multiple to one of the collector members.

4. A commutating machine comprising a distributed induced winding having a plurality of leads, a field coil arranged to produce a magnetic flux traversing the winding, means including a rotor disposed within the field coil for causing the flux which traverses the winding to alternate and revolve at a higher angular velocity than that of the rotor as the rotor rotates, a plurality of collector members, at least one lead being connected to each collector member, and a commutator rotative at the angular velocity of the rotor, the commutator being divided into a plurality of insulated segments arranged in consecutive groups, each group containing a number of segments corresponding to that of the collector members, and the corresponding segments of each group being connected in multiple to one of the collector members and forming a set.

5. A commutating machine comprising a rotor, a field coil surrounding the rotor circumferentially thereof, a distributed induced winding arranged upon the rotor and having a plurality of leads, a plurality of collector members, at least one lead being connected to each collector member, the rotor including a plurality of magnetic conductors arranged to cause the flux which cuts the winding to rapidly reverse in direction and to revolve at a higher angular velocity than the rotor, and a commutator rotative at the angular velocity of the rotor, the commutator being divided into a plurality of insulated segments arranged in consecutive groups, each group containing a number of segments corresponding to that of the collector members, and the corresponding segments of each group being connected in multiple to one of the collector members and forming a set.

6. A commutating machine comprising a stator, a rotor arranged axially within the stator, a field coil surrounding the rotor circumferentially thereof, a distributed induced winding having a plurality of leads and arranged upon the rotor, a plurality of collector members, at least one lead being connected to each collector member, the rotor and the stator including a plurality of flux conductors coöperative as the rotor rotates to cause the flux which traverses the winding to rapidly reverse and to revolve at a higher angular velocity than the rotor, and a commutator rotative at the angular velocity of the rotor, the commutator being divided into a plurality of insulated segments arranged in consecutive groups, each group containing a number of segments corresponding to that of the collector members, and the corresponding segments of each group being connected in multiple to one of the collector members and forming a set.

7. A commutating machine comprising a field coil and a source of magnetizing current therefor, a rotatable armature winding disposed within the field coil and arranged to be traversed by the field flux, a plurality of stationary flux conductors and a plurality of rotative flux conductors coöperative to cause the flux which traverses the winding to rapidly reverse in direction and revolve at a higher angular velocity than that of the armature winding, a plurality of collector rings arranged to have currents supplied thereto and taken therefrom, and a commutator rotative with the armature winding and divided into a plurality of insulated segments arranged in consecutive groups, each group containing a number of segments corresponding in number to that of the collector rings and the corresponding segments of each group being connected in multiple to one of the collector rings.

8. A commutating machine comprising a rotor, a field coil surrounding the rotor circumferentially thereof, a distributed induced winding arranged upon the rotor, the rotor including a plurality of magnetic conductors arranged to cause the flux which cuts the winding to rapidly reverse in direction and to revolve at a higher angular velocity than the rotor, a plurality of collector rings arranged upon the rotor and adapted to have current supplied thereto and taken therefrom, a number of leads from the induced winding, at least one lead being connected to each collector ring, and a commutator rotative at the angular velocity of the rotor, the commutator being divided into a plurality of insulated segments arranged in consecutive groups, each group containing a number of segments corresponding to that of the collector rings and the corresponding segments of each group being connected in multiple to one of the collector rings and forming a set.

9. A commutating machine comprising a stator, a rotor arranged axially within the stator, a field coil surrounding the rotor circumferentially thereof, a distributed induced winding arranged upon the rotor, a plurality of collector rings on the rotor adapted to have current supplied thereto and taken therefrom, a number of leads from the induced winding, at least one lead being connected to each collector ring, the rotor and the stator including a plurality of flux conductors coöperative as the rotor rotates to cause the flux which traverses the winding to rapidly reverse and to revolve at a higher angular velocity than the rotor, and a commutator rotative at the angular velocity of the rotor, the commutator being divided into a plurality of insulated segments arranged in consecutive groups, each group containing a number of segments corresponding to that of the collector rings and the corresponding segments of each group being connected in multiple to one of the collector rings and forming a set.

10. A commutating machine comprising a stator having a plurality of equally spaced longitudinally extending internal teeth, a magnetizing winding arranged within the stator, a rotor disposed axially within the magnetizing coil and having a plurality of equally spaced longitudinally extending teeth different in number from those on the stator and coöperative therewith to cause the path of least magnetic reluctance between the rotor and the stator to revolve about the rotor as the rotor rotates and at a greater angular velocity than that of the rotor and to cause the revolving flux to rapidly reverse in direction, a distributed induced winding on the rotor and arranged to be cut by the revolving alternating magnetic flux, a plurality of leads from the winding, a plurality of collector members, at least one lead being connected to each collector member, a commutator on the rotor, the commutator being divided into a plurality of insulated segments arranged in consecutive groups, each group containing a number of segments corresponding to that of the collector members, and the corresponding segments of each group being connected in multiple to one of the collector members and forming a set.

11. A commutating machine comprising a stator having two similar spaced magnetic stator elements arranged side by side, a rotor axially disposed within the stator and having two similar spaced rotor elements arranged side by side, one rotor element being disposed concentrically within each stator element, a magnetizing winding surrounding the rotor between the two elements, the rotor and stator having a plurality of magnetic conductors coöperative to cause the path of least magnetic reluctance between the rotor and the stator to revolve about the rotor as the rotor rotates at a greater angular velocity than that of the rotor and to cause the revolving flux to rapidly reverse in direction, a distributed induced winding on the rotor and arranged to be cut by the revolving alternating magnetic flux, a plurality of leads from the winding, a plurality of collector members, at least one lead being connected to each collector member, and a commutator on the rotor, the commutator being divided into a plurality of insulated segments arranged in consecutive groups, each group containing a number of segments corresponding to that of the collector members, and the corresponding segments of each group being connected in multiple to one of the collector members and forming a set.

12. A commutating machine comprising a stator having two similar spaced magnetic stator elements arranged side by side and each stator element being provided with a similar number of equally spaced longitudinally-extending teeth, a rotor axially disposed within the stator and having two similar spaced rotor elements arranged side by side, one rotor element being disposed concentrically within each stator element and each rotor element being provided on its periphery with a similar number of equally spaced longitudinally-extending teeth differing in number from those on the stator elements, thereby forming two pairs of coöperative elements, each pair comprising a stator and a rotor element, and the teeth on one element of one pair being off-set circumferentially a half tooth pitch relative to those of the corresponding element of the other pair, a field coil surrounding the rotor and disposed between the two pairs of elements, whereby the flux is made to rapidly reverse and to revolve at a greater angular velocity than that of the rotor, a distributed induced winding on the rotor and arranged to be cut by the revolving alternating magnetic flux, a plurality of leads from the winding, a plurality of collector members, at least one lead being connected to each collector member, and a commutator on the rotor, the commutator being divided into a plurality of insulated segments arranged in consecutive groups, each group containing a number of segments corresponding to that of the collector members, and the corresponding segments of each group being connected in multiple to one of the collector members and forming a set.

13. A commutating machine comprising a stator having two similar spaced magnetic stator elements arranged side by side and each stator element being provided with a similar number of equally spaced longitudinally-extending teeth, a rotor axially disposed within the stator and having two similar spaced rotor elements arranged side by side, one rotor element being disposed concentrically within each stator element and each rotor element being provided on its periphery with a similar number of equally spaced longitudinally-extending teeth differing in number from those on the stator elements, thereby forming two pairs of coöperative elements, each pair comprising a stator and a rotor element, and the teeth on one element of one pair being off-set circumferentially a half tooth pitch relative to those of the corresponding element of the other pair, a plurality of series of bars of magnetic material between each stator and rotor element, the alternate series of bars being stationary and the other series of bars being carried by the rotor and rotatable therewith, the stationary bars being equal in number and radially alined with the teeth on the respective stator elements and the rotatable bars being equal in number and radially alined with the teeth of the respective rotor elements, a field coil surrounding the rotor and disposed between the two pairs of elements, whereby the flux is made to rapidly reverse and to revolve at a greater angular velocity than that of the rotor, a distributed induced winding on the rotor and arranged to be cut by the revolving alternating magnetic flux, a plurality of leads from the winding, a plurality of collector members, at least one lead being connected to each collector member, and a commutator on the rotor, the commutator being divided into a plurality of insulated segments arranged in consecutive groups, each group containing a number of segments corresponding to that of the collector members, and the corresponding segments of each group being connected in multiple to one of the collector members and forming a set.

14. A commutating machine comprising a distributed induced winding, a field coil arranged to produce a magnetic flux traversing the winding, a rotor disposed within the field coil and including a plurality of magnetic conductors arranged to cause the flux which cuts the winding to rapidly reverse in direction and to revolve at a higher angular velocity than that of the rotor, a plurality of leads from the winding, a plurality of collector members, at least one lead being connected to each collector member, and a commutator rotative at the angular velocity of the rotor, the commutator being divided into a plurality of insulated segments arranged in consecutive groups equal in number to that of the complete cycles of current induced in the winding during each rotation of the rotor, each group containing a number of segments corresponding to that of the collector members, and the corresponding segments of each group being connected in multiple to one of the collector members and forming a set.

15. A commutating machine comprising a distributed induced winding, a field coil arranged to produce a magnetic flux traversing the winding, a rotor disposed within the field coil and including a plurality of magnetic conductors arranged to cause the flux which cuts the winding to rapidly reverse in direction and to revolve at a higher angular velocity than the rotor, a plurality of collector rings on the rotor adapted to have current supplied thereto and taken therefrom, a number of leads from the induced winding, at least one lead being connected to each collector ring, and a commutator rotative at the angular velocity of the rotor, the commutator being divided into a plurality of insulated segments arranged in consecutive groups equal in number to that of the complete cycles of current induced in the winding during each rotation of the rotor, each group containing a number of segments corresponding to that of the collector rings, and the corresponding segments of each group being connected in multiple to one of the collector rings and forming a set.

16. A commutating machine comprising a stator having two similar spaced magnetic stator elements arranged side by side and each stator element being provided with a similar number of equally spaced longitudinally-extending teeth, a rotor axially disposed within the stator and having two similar spaced rotor elements arranged side by side, one rotor element being disposed concentrically within each stator element and each rotor element being provided on its periphery with a similar number of equally spaced longitudinally extending teeth differing in number from those on the stator elements, thereby forming two pairs of coöperative elements, each pair comprising a stator and a rotor element, and the teeth on one element of one pair being offset circumferentially a half tooth pitch relative to those of the corresponding element of the other pair, a field coil surrounding the rotor and disposed between the two pairs of elements, whereby the flux is made to rapidly reverse and to revolve at a greater angular velocity than that of the rotor, and a distributed induced winding on the rotor and rotative therewith and arranged to be cut by the revolving alternating magnetic flux.

In witness whereof, I subscribe my signature, in the presence of two witnesses.

ALFONS H. NEULAND.

Witnesses:
VICTOR D. BORST,
WALDO M. CHAPIN.

Copies of this patent may be obtained for five cents each, by addressing the "Commissioner of Patents, Washington, D. C."